US012712773B2

(12) United States Patent
Zhang et al.

(10) Patent No.: US 12,712,773 B2
(45) Date of Patent: Aug. 18, 2026

(54) FLEXIBLE GUARD INTERVAL CONFIGURATIONS

(71) Applicant: QUALCOMM Incorporated, San Diego, CA (US)

(72) Inventors: Xiaoxia Zhang, San Diego, CA (US); Jun Ma, San Diego, CA (US); Morteza Soltani, San Diego, CA (US); Jing Sun, San Diego, CA (US); Raviteja Patchava, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 17/443,399

(22) Filed: Jul. 26, 2021

(65) Prior Publication Data

US 2023/0023316 A1 Jan. 26, 2023

(51) Int. Cl.
*H04L 27/26* (2006.01)
*H04W 72/23* (2023.01)

(52) U.S. Cl.
CPC ...... *H04L 27/2607* (2013.01); *H04L 27/2605* (2013.01); *H04W 72/23* (2023.01)

(58) Field of Classification Search
CPC ............. H04L 27/2607; H04L 27/2636; H04L 27/2605; H04W 72/23
See application file for complete search history.

(56) References Cited

U.S. PATENT DOCUMENTS 10,159,068 B2 * 12/2018 Zhang .................. H04L 5/0055
10,404,509 B2 * 9/2019 Sun .................... H04L 27/2636
11,223,505 B2 * 1/2022 Zhang .................. H04L 5/1469
11,855,818 B1 * 12/2023 Sun .................... H04L 27/2646
2014/0010159 A1 * 1/2014 Davydov ............. H04W 72/21 370/328
2014/0355626 A1 * 12/2014 Fechtel ................... H04L 69/22 370/474
2016/0352551 A1 * 12/2016 Zhang .................. H04L 5/0007
2018/0019848 A1 * 1/2018 Lomayev ............ H04L 27/2636
2018/0026749 A1 * 1/2018 Lomayev ............. H04L 1/0643 375/267
2018/0331870 A1 * 11/2018 Sun ....................... H04L 5/0007
2019/0020522 A1 * 1/2019 Sun ................... H04L 27/26134
2019/0132829 A1 * 5/2019 Bhattad ............... H04L 27/2607
2020/0067748 A1 * 2/2020 Zhang ............... H04L 27/26025
2021/0266055 A1 * 8/2021 Li ....................... H04B 7/0682
2022/0045796 A1 * 2/2022 Bayesteh ............. H04L 1/1692

* cited by examiner

*Primary Examiner* — Mounir Moutaouakil
(74) *Attorney, Agent, or Firm* — Harrity & Harrity, LLP

(57) ABSTRACT

Various aspects of the present disclosure generally relate to wireless communication. In some aspects, a receiving device may receive, from a first wireless communication device on a first communication channel, a first communication that is configured with at least one guard interval (GI) sequence of a first GI type. The receiving device may receive, from the first wireless communication device or a second wireless communication device on the first communication channel or a second communication channel, a second communication that is configured with at least one GI sequence of a second GI type. Numerous other aspects are described.

30 Claims, 9 Drawing Sheets

500

600

FLEXIBLE GUARD INTERVAL CONFIGURATIONS

FIELD OF THE DISCLOSURE

Aspects of the present disclosure generally relate to wireless communication and to techniques and apparatuses for flexible guard interval configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. “Downlink” (or “DL”) refers to a communication link from the base station to the UE, and “uplink” (or “UL”) refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a receiving device. The apparatus may include a memory. The apparatus may include one or more processors, coupled to the memory, configured, receive, from a first wireless communication device on a first communication channel, a first communication that is configured with at least one guard interval (GI) sequence of a first GI type receive, from the first wireless communication device or a second wireless communication device on the first communication channel or a second communication channel, a second communication that is configured with at least one GI sequence of a second GI type.

Some aspects described herein relate to an apparatus for wireless communication at a transmitting device. The apparatus may include a memory. The apparatus may include one or more processors, coupled to the memory, configured, transmit, to a wireless communication device on a first communication channel, a first communication that is configured with at least one GI sequence of a first GI type transmit, to the wireless communication device on a second communication channel, a second communication that is configured with at least one GI sequence of a second GI type.

Some aspects described herein relate to an apparatus for wireless communication at a receiving device. The apparatus may include a memory. The apparatus may include one or more processors, coupled to the memory, configured, determine a selected GI type of a plurality of GI types to be used to receive a communication from a wireless communication device receive the communication from the wireless communication device and based at least in part on a GI sequence of the selected GI type.

Some aspects described herein relate to a method of wireless communication performed by a receiving device. The method may include receiving, from a first wireless communication device on a first communication channel, a first communication that is configured with at least one GI sequence of a first GI type. The method may include receiving, from the first wireless communication device or a second wireless communication device on the first communication channel or a second communication channel, a second communication that is configured with at least one GI sequence of a second GI type.

Some aspects described herein relate to a method of wireless communication performed by a transmitting device. The method may include transmitting, to a wireless communication device on a first communication channel, a first communication that is configured with at least one GI sequence of a first GI type. The method may include transmitting, to the wireless communication device on a second communication channel, a second communication that is configured with at least one GI sequence of a second GI type.

Some aspects described herein relate to a method of wireless communication performed by a receiving device. The method may include determining a selected GI type of a plurality of GI types to be used to receive a communication from a wireless communication device. The method may include receiving the communication from the wireless communication device and based at least in part on a GI sequence of the selected GI type.

Some aspects described herein relate to a non-transitory computer-readable medium that stores a set of instructions for wireless communication by a receiving device. The set of instructions, when executed by one or more processors of the receiving device, may cause the receiving device to receive, from a first wireless communication device on a first communication channel, a first communication that is configured with at least one GI sequence of a first GI type. The set of instructions, when executed by one or more processors of the receiving device, may cause the receiving device to receive, from the first wireless communication device or a second wireless communication device on the first communication channel or a second communication channel, a second communication that is configured with at least one GI sequence of a second GI type.

Some aspects described herein relate to a non-transitory computer-readable medium that stores a set of instructions for wireless communication by a transmitting device. The set of instructions, when executed by one or more processors of the transmitting device, may cause the transmitting device to transmit, to a wireless communication device on a first communication channel, a first communication that is configured with at least one GI sequence of a first GI type. The set of instructions, when executed by one or more processors of the transmitting device, may cause the transmitting device to transmit, to the wireless communication device on a second communication channel, a second communication that is configured with at least one GI sequence of a second GI type.

Some aspects described herein relate to a non-transitory computer-readable medium that stores a set of instructions for wireless communication by a receiving device. The set of instructions, when executed by one or more processors of the receiving device, may cause the receiving device to determine a selected GI type of a plurality of GI types to be used to receive a communication from a wireless communication device. The set of instructions, when executed by one or more processors of the receiving device, may cause the receiving device to receive the communication from the wireless communication device and based at least in part on a GI sequence of the selected GI type.

Some aspects described herein relate to an apparatus for wireless communication. The apparatus may include means for receiving, from a first wireless communication device on a first communication channel, a first communication that is configured with at least one GI sequence of a first GI type. The apparatus may include means for receiving, from the first wireless communication device or a second wireless communication device on the first communication channel or a second communication channel, a second communication that is configured with at least one GI sequence of a second GI type.

Some aspects described herein relate to an apparatus for wireless communication. The apparatus may include means for transmitting, to a wireless communication device on a first communication channel, a first communication that is configured with at least one GI sequence of a first GI type. The apparatus may include means for transmitting, to the wireless communication device on a second communication channel, a second communication that is configured with at least one GI sequence of a second GI type.

Some aspects described herein relate to an apparatus for wireless communication. The apparatus may include means for determining a selected GI type of a plurality of GI types to be used to receive a communication from a wireless communication device. The apparatus may include means for receiving the communication from the wireless communication device and based at least in part on a GI sequence of the selected GI type.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
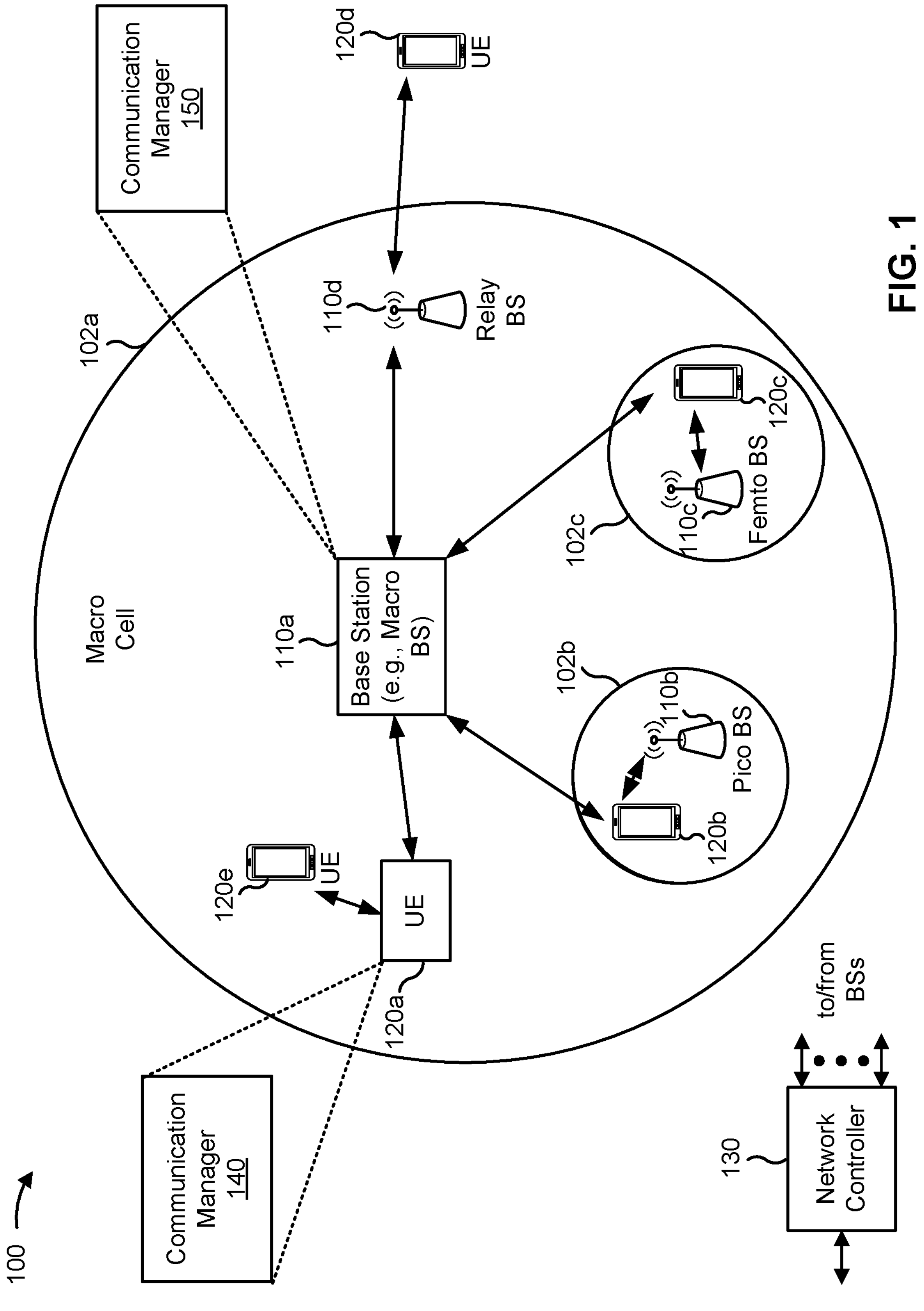
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the receiving device may include a communication manager 140 or 150. As described in more detail elsewhere herein, the communication manager 140 or 150 may receive, from a first wireless communication device on a first communication channel, a first communication that is configured with at least one guard interval (GI) sequence of a first GI type; and receive, from the first wireless communication device or a second wireless communication device on the first communication channel or a second communication channel, a second communication that is configured with at least one GI sequence of a second GI type. As described in more detail elsewhere herein, the communication manager 140 or 150 may determine a selected GI type of a plurality of GI types to be used to receive a communication from a wireless communication device; and receive the communication from the wireless communication device and based at least in part on a GI sequence of the selected GI type. Additionally, or alternatively, the communication manager 140 or 150 may perform one or more other operations described herein.

In some aspects, the transmitting device may include a communication manager 140 or 150. As described in more detail elsewhere herein, the communication manager 140 or 150 may transmit, to a wireless communication device on a first communication channel, a first communication that is configured with at least one GI sequence of a first GI type; and transmit, to the wireless communication device on a second communication channel, a second communication that is configured with at least one GI sequence of a second GI type. Additionally, or alternatively, the communication manager 140 or 150 may perform one or more other operations described herein.

As indicated above, FIG. 1 is provided as an example. Other examples may differ from what is described with regard to FIG. 1.

Figure 2:
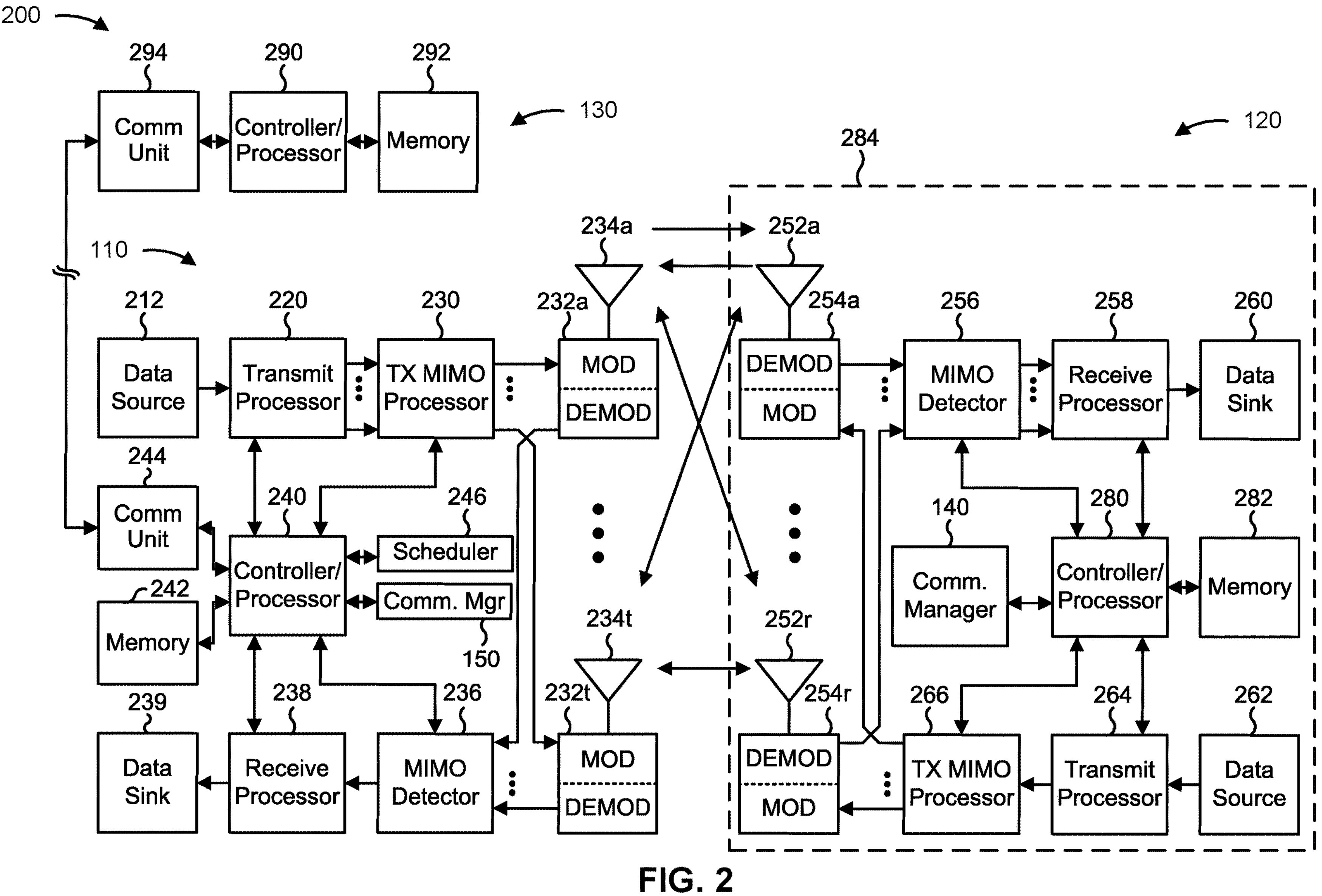
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with flexible GI configurations, as described in more detail elsewhere herein. In some aspects, the transmitting device and/or the receiving device described herein is the base station 110, is included in the base station 110, or includes one or more components of the base station 110 shown in FIG. 2. In some aspects, the transmitting device and/or the receiving device described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the receiving device includes means for receiving, from a first wireless communication device on a first communication channel, a first communication that is configured with at least one GI sequence of a first GI type; and/or means for receiving, from the first wireless communication device or a second wireless communication device on the first communication channel or a second communication channel, a second communication that is configured with at least one GI sequence of a second GI type. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitting device includes means for transmitting, to a wireless communication device on a first communication channel, a first communication that is configured with at least one GI sequence of a first GI type; and/or means for transmitting, to the wireless communication device on a second communication channel, a second communication that is configured with at least one GI sequence of a second GI type. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitting device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the receiving device includes means for determining a selected GI type of a plurality of GI types to be used to receive a communication from a wireless communication device; means for receiving the communication from the wireless communication device and based at least in part on a GI sequence of the selected GI type. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figures 3A, 3B:
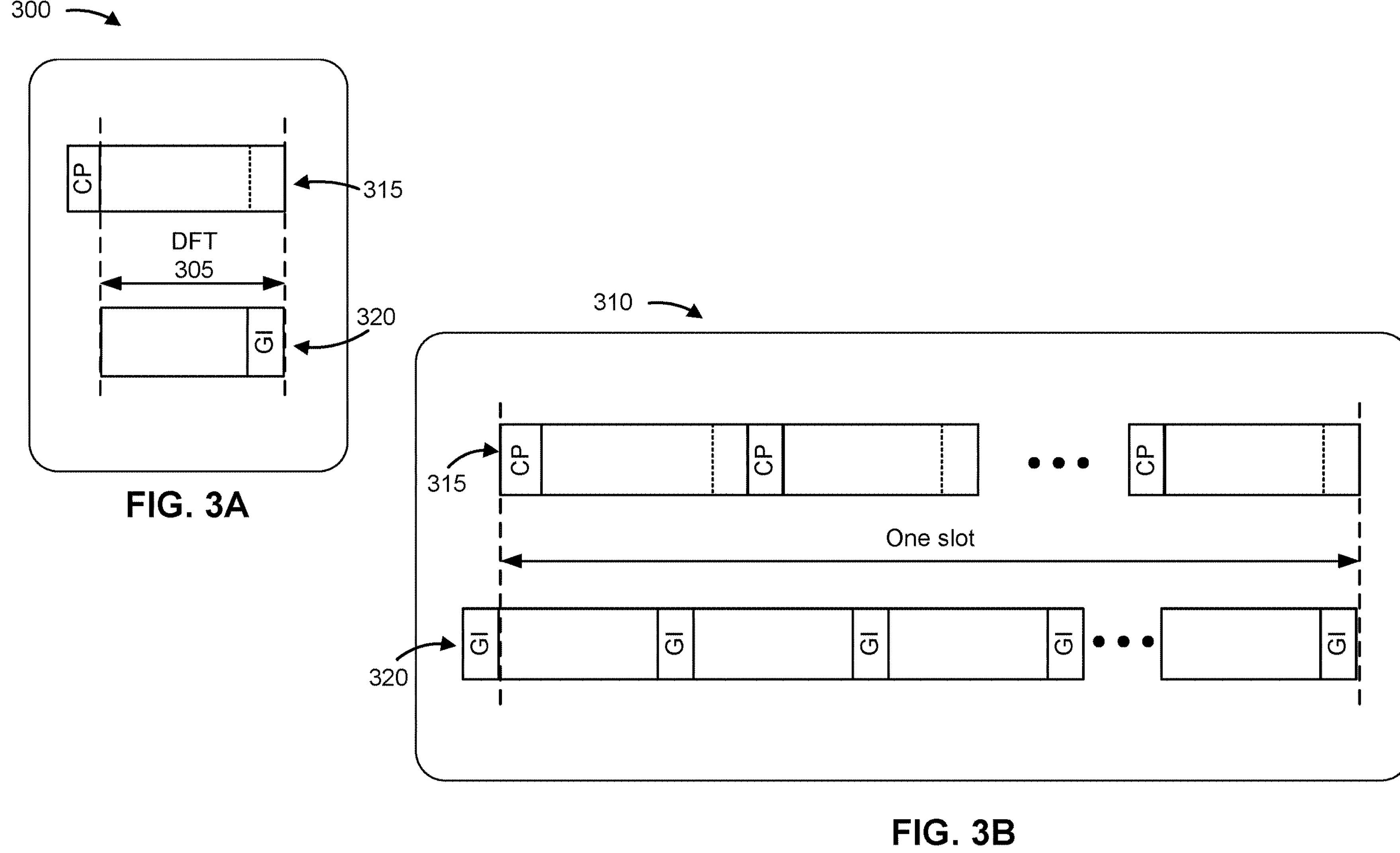
FIGS. 3A and 3B are diagrams illustrating examples of the use of cyclic prefix (CP) and guard interval (GI) for single-carrier (SC) waveforms, in accordance with the present disclosure.

FIGS. 3A and 3B are diagrams illustrating examples of the use of cyclic prefix (CP) and guard interval (GI) for single-carrier (SC) waveforms, in accordance with the present disclosure. FIG. 3A illustrates an example 300 of a symbol having a discrete Fourier transform (DFT) processing duration 305 and FIG. 3B illustrates an example 310 of a slot having a number of symbols. As shown, a communication 315 may utilize CP, and a communication 320 may use GI.

CP and/or GI may be used to convert the linear convolution of transmitted symbols with the channel to a circular convolution to facilitate a one-tap frequency domain equalization at the receiver. In this way, CP and GI may be used, for example, to avoid inter-symbol interference and/or maintain alignment of symbols and/or slots. CP is generally contained within a slot, but, as shown in FIG. 3A, is outside of a DFT processing duration 305 within a symbol, whereas GI is within the DFT processing duration 305. However, as shown in FIG. 3B, GI is not necessarily contained within a slot. CP is generated using random data, whereas GI is generated using a known sequence.

GI sequences may be of different GI sequence types such as, for example, zero GI sequences and non-zero GI sequences. Non-zero GI sequences allow for use of the GI for channel estimation, tracking, and/or phase noise compensation, among other examples. Non-zero GI sequences also can provide better peak-to-average power ratio (PAPR)

and out of band (OOB) leakage. Zero GI sequences allow for more efficient intra-symbol multiplexing. Zero GI sequences also allow receiving device to process only a fraction of a symbol. A receiving device and/or a transmitting device is generally assigned a GI sequence type and, as a result, the receiving device may not be able to realize benefits of another GI sequence type, which may have a negative impact on network performance.

Some aspects of techniques and apparatuses described herein may facilitate configuring a device and/or a communication channel with different GI sequences. For example, in some aspects, a receiving device may receive, from a first wireless communication device on a first communication channel, a first communication that is configured with at least one GI sequence of a first GI type. The receiving device may receive, from the first wireless communication device or a second wireless communication device on the first communication channel or a second communication channel, a second communication that is configured with at least one GI sequence of a second GI type. In some aspects, a transmitting device may transmit, to a wireless communication device on a first communication channel, a first communication that is configured with at least one GI sequence of a first GI type. The transmitting device may transmit, to the wireless communication device on a second communication channel, a second communication that is configured with at least one GI sequence of a second GI type. In some aspects, a receiving device may determine a selected GI type of a plurality of GI types to be used to receive a communication from a wireless communication device and may receive the communication from the wireless communication device and based at least in part on a GI sequence of the selected GI type. In this way, some aspects may facilitate flexible GI sequence configurations, which may have a positive impact on network performance.

As indicated above, FIG. 3 is provided as an example. Other examples may differ from what is described with regard to FIG. 3.

Figure 4:
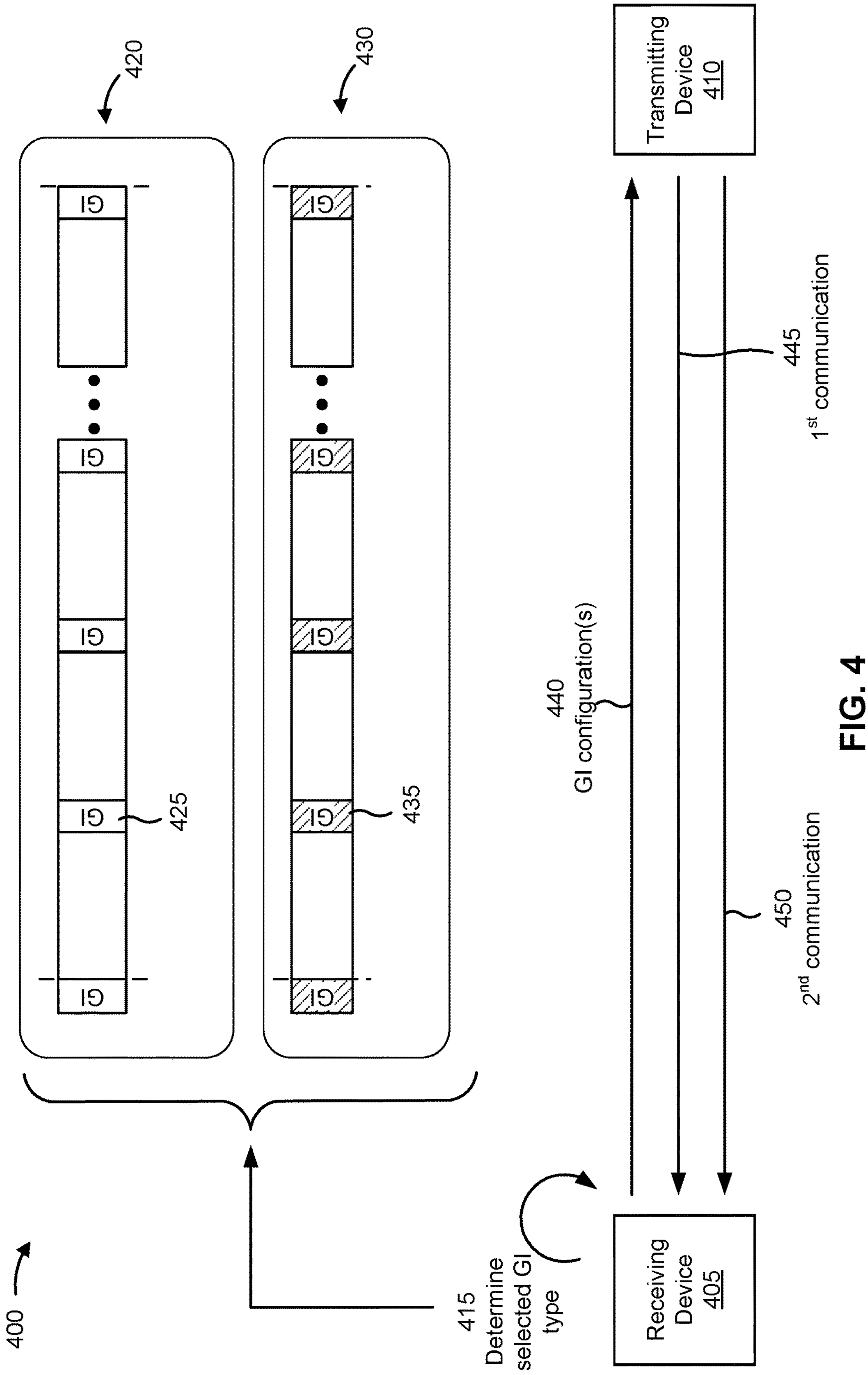
FIG. 4 is a diagram illustrating an example associated with flexible GI configurations, in accordance with the present disclosure.

FIG. 4 is a diagram illustrating an example 400 of flexible GI configurations, in accordance with the present disclosure. As shown in FIG. 4, a receiving device 405 and a transmitting device 410 may communicate with one another. In some aspects, more than one receiving device 405 and/or more than one transmitting device 410 may communicate as described herein.

As shown by reference number 415, the receiving device 405 may determine a selected GI type of a plurality of GI types to be used to receive a communication from a wireless communication device (e.g., the transmitting device 410). The selected GI type may include a non-zero GI type or a zero GI type. For example, as shown by reference number 420, a non-zero GI type may correspond to GIs 425 that have some time duration. As shown by reference number 430, a zero GI type may correspond to GIs 435 that have no time duration. A zero GI type may be used, for example, where a communication channel is a physical downlink control channel (PDCCH) and/or with a communication that is an ultra-reliable low latency communication (URLLC). In some aspects, a first GI type may be configured for a first channel, transmitting device, and/or communication, and a second GI type may be configured for a second channel, transmitting device, and/or communication.

In some aspects, the receiving device 405 may determine that a processing criterion satisfies a processing threshold and may determine the selected GI type based at least in part on determining that the processing criterion satisfies the processing threshold. For example, if the receiving device is running a number of processes and has few processing resources available, it may select a zero GI to allow for partial symbol processing. In some aspects, the receiving device 405 may receive a GI configuration that indicates a gap in each symbol of a plurality of symbols to facilitate resetting the GI type for partial processing.

In some aspects, the receiving device 405 may determine an updated GI type of the plurality of GI types to be used to receive an additional communication from at least one of the wireless communication device or an additional wireless communication device (e.g., from the transmitting device 410 and/or an additional transmitting device 410). For example, the selected GI type comprises a zero GI type and the updated GI type comprises a non-zero GI type.

As shown by reference number 440, the receiving device 405 may transmit, and the transmitting device 410 may receive, one or more GI configurations. For example, the one or more GI configurations may include a first GI configuration that indicates the at least one GI sequence of the first GI type and a second GI configuration that indicates the at least one GI sequence of the second GI type. In some aspects, the receiving device 405 may transmit the first GI configuration to the transmitting device 410, and the second GI configuration to an additional transmitting device.

As shown by reference number 445, the transmitting device 410 may transmit, and the receiving device 405 may receive, on a first communication channel, a first communication that is configured with at least one GI sequence of a first GI type. As shown by reference number 450, the transmitting device 410 may transmit, and the receiving device 405 may receive, on the first communication channel or a second communication channel, a second communication that is configured with at least one GI sequence of a second GI type. In some aspects, the second communication may be transmitted by an additional transmitting device.

As indicated above, FIG. 4 is provided as an example. Other examples may differ from what is described with regard to FIG. 4.

Figure 5:
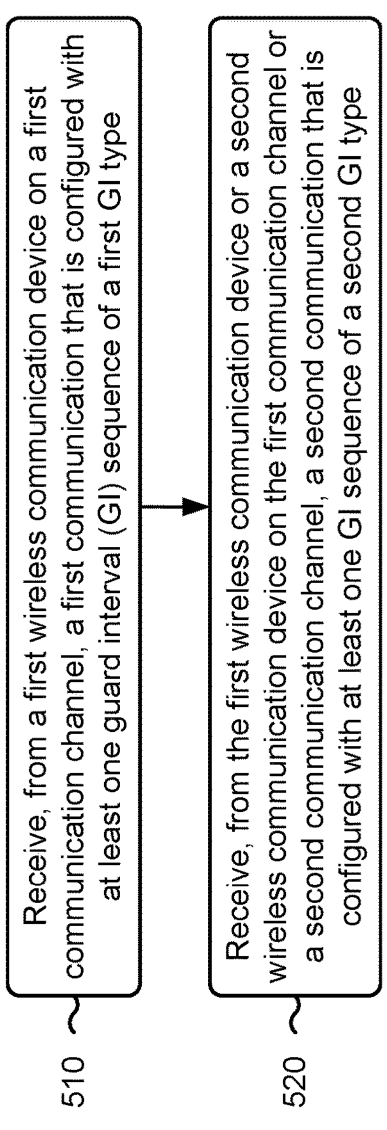
FIGS. 5-7 are diagrams illustrating example processes associated with flexible GI configurations, in accordance with the present disclosure.
Figure 5:

FIG. 5 is a diagram illustrating an example process 500 performed, for example, by a receiving device, in accordance with the present disclosure. Example process 500 is an example where the receiving device (e.g., receiving device 405) performs operations associated with flexible GI configurations.

As shown in FIG. 5, in some aspects, process 500 may include receiving, from a first wireless communication device on a first communication channel, a first communication that is configured with at least one GI sequence of a first GI type (block 510). For example, the receiving device (e.g., using communication manager 808 and/or reception component 802, depicted in FIG. 8) may receive, from a first wireless communication device on a first communication channel, a first communication that is configured with at least one GI sequence of a first GI type, as described above.

As further shown in FIG. 5, in some aspects, process 500 may include receiving, from the first wireless communication device or a second wireless communication device on the first communication channel or a second communication channel, a second communication that is configured with at least one GI sequence of a second GI type (block 520). For example, the receiving device (e.g., using communication manager 808 and/or reception component 802, depicted in FIG. 8) may receive, from the first wireless communication device or a second wireless communication device on the first communication channel or a second communication channel, a second communication that is configured with at least one GI sequence of a second GI type, as described above.

Process 500 may include additional aspects, such as any single aspect or any combination of aspects described below and/or in connection with one or more other processes described elsewhere herein.

In a first aspect, process 500 includes transmitting, to the first wireless communication device, a first GI configuration that indicates the at least one GI sequence of the first GI type.

In a second aspect, alone or in combination with the first aspect, process 500 includes transmitting, to the second wireless communication device, a second GI configuration that indicates the at least one GI sequence of the second GI type.

In a third aspect, alone or in combination with one or more of the first and second aspects, process 500 includes transmitting, to the first wireless communication device, a second GI configuration that indicates the at least one GI sequence of the second GI type.

In a fourth aspect, alone or in combination with one or more of the first through third aspects, the first GI type comprises a zero GI type.

In a fifth aspect, alone or in combination with the fourth aspect, the first communication channel comprises a physical downlink control channel.

In a sixth aspect, alone or in combination with one or more of the fourth through fifth aspects, the first communication comprises an ultra-reliable low latency communication (URLLC).

In a seventh aspect, alone or in combination with one or more of the first through sixth aspects, the second GI type comprises a non-zero GI type.

In an eighth aspect, alone or in combination with the seventh aspect, process 500 includes determining that the second communication satisfies at least one symbol level processing criterion, wherein the second GI type comprises the non-zero GI type based at least in part on determining that the second communication satisfies the at least one symbol level processing criterion.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
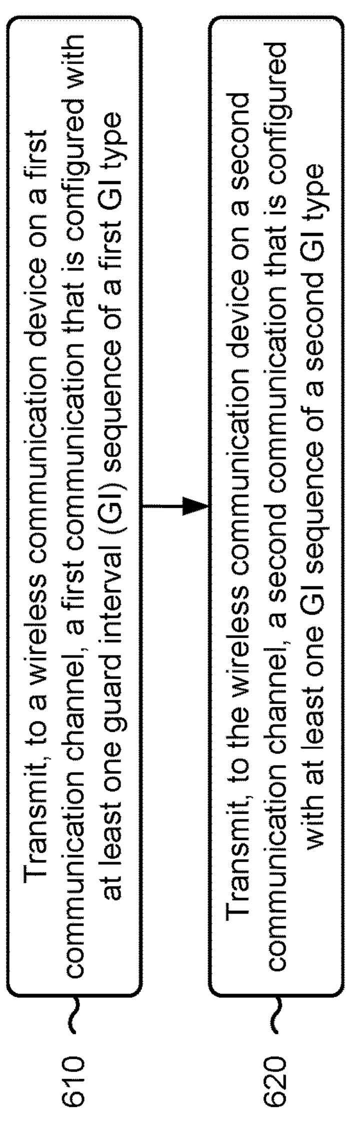

FIG. 6 is a diagram illustrating an example process 600 performed, for example, by a transmitting device, in accordance with the present disclosure. Example process 600 is an example where the transmitting device (e.g., transmitting device 410) performs operations associated with flexible GI configurations.

As shown in FIG. 6, in some aspects, process 600 may include transmitting, to a wireless communication device on a first communication channel, a first communication that is configured with at least one GI sequence of a first GI type (block 610). For example, the transmitting device (e.g., using communication manager 908 and/or transmission component 904, depicted in FIG. 9) may transmit, to a wireless communication device on a first communication channel, a first communication that is configured with at least one GI sequence of a first GI type, as described above.

As further shown in FIG. 6, in some aspects, process 600 may include transmitting, to the wireless communication device on a second communication channel, a second communication that is configured with at least one GI sequence of a second GI type (block 620). For example, the transmitting device (e.g., using communication manager 908 and/or transmission component 904, depicted in FIG. 9) may transmit, to the wireless communication device on a second communication channel, a second communication that is configured with at least one GI sequence of a second GI type, as described above.

Process 600 may include additional aspects, such as any single aspect or any combination of aspects described below and/or in connection with one or more other processes described elsewhere herein.

In a first aspect, process 600 includes receiving a GI configuration that indicates the at least one GI sequence of the first GI type and the at least one GI sequence of the second GI type.

In a second aspect, alone or in combination with the first aspect, the first GI type comprises a zero GI type.

In a third aspect, alone or in combination with the second aspect, the first communication channel comprises a physical downlink control channel (PDCCH).

In a fourth aspect, alone or in combination with the third aspect, the first communication comprises a URLLC.

In a fifth aspect, alone or in combination with one or more of the first through fourth aspects, the second GI type comprises a non-zero GI type.

In a sixth aspect, alone or in combination with the fifth aspect, process 600 includes determining that the second communication satisfies at least one symbol level processing criterion, wherein the second GI type comprises the non-zero GI type based at least in part on determining that the second communication satisfies the at least one symbol level processing criterion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
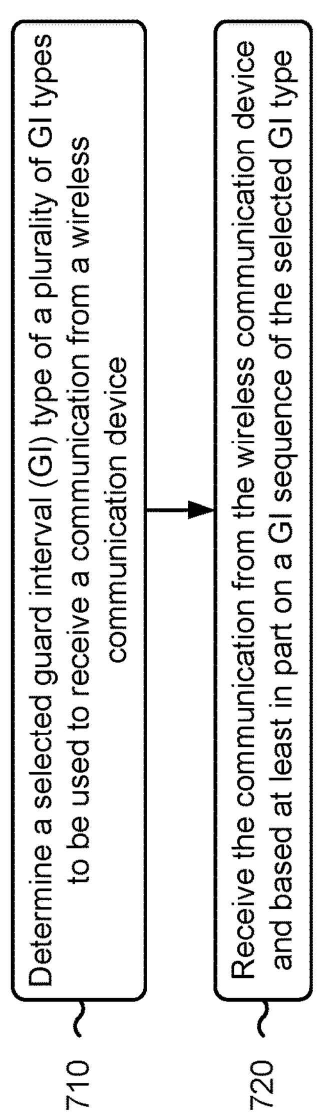

FIG. 7 is a diagram illustrating an example process 700 performed, for example, by a receiving device, in accordance with the present disclosure. Example process 700 is an example where the receiving device (e.g., receiving device 405) performs operations associated with flexible guard interval configurations.

As shown in FIG. 7, in some aspects, process 700 may include determining a selected GI type of a plurality of GI types to be used to receive a communication from a wireless communication device (block 710). For example, the receiving device (e.g., using communication manager 808 and/or determination component 810, depicted in FIG. 8) may determine a selected GI type of a plurality of GI types to be used to receive a communication from a wireless communication device, as described above.

As further shown in FIG. 7, in some aspects, process 700 may include receiving the communication from the wireless communication device and based at least in part on a GI sequence of the selected GI type (block 720). For example, the receiving device (e.g., using communication manager 808 and/or reception component 802, depicted in FIG. 8) may receive the communication from the wireless communication device and based at least in part on a GI sequence of the selected GI type, as described above.

Process 700 may include additional aspects, such as any single aspect or any combination of aspects described below and/or in connection with one or more other processes described elsewhere herein.

In a first aspect, process 700 includes determining that a processing criterion satisfies a processing threshold, wherein determining the selected GI type comprises determining the selected GI type based at least in part on determining that the processing criterion satisfies the processing threshold.

In a second aspect, alone or in combination with the first aspect, process 700 includes receiving a GI configuration that indicates a gap in each symbol of a plurality of symbols to facilitate resetting the GI type for partial processing.

In a third aspect, alone or in combination with the second aspect, process 700 includes determining an updated GI type of the plurality of GI types to be used to receive an additional communication from at least one of the wireless communication device or an additional wireless communication device.

In a fourth aspect, alone or in combination with the third aspect, the selected GI type comprises a zero GI type and wherein the updated GI type comprises a non-zero GI type.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
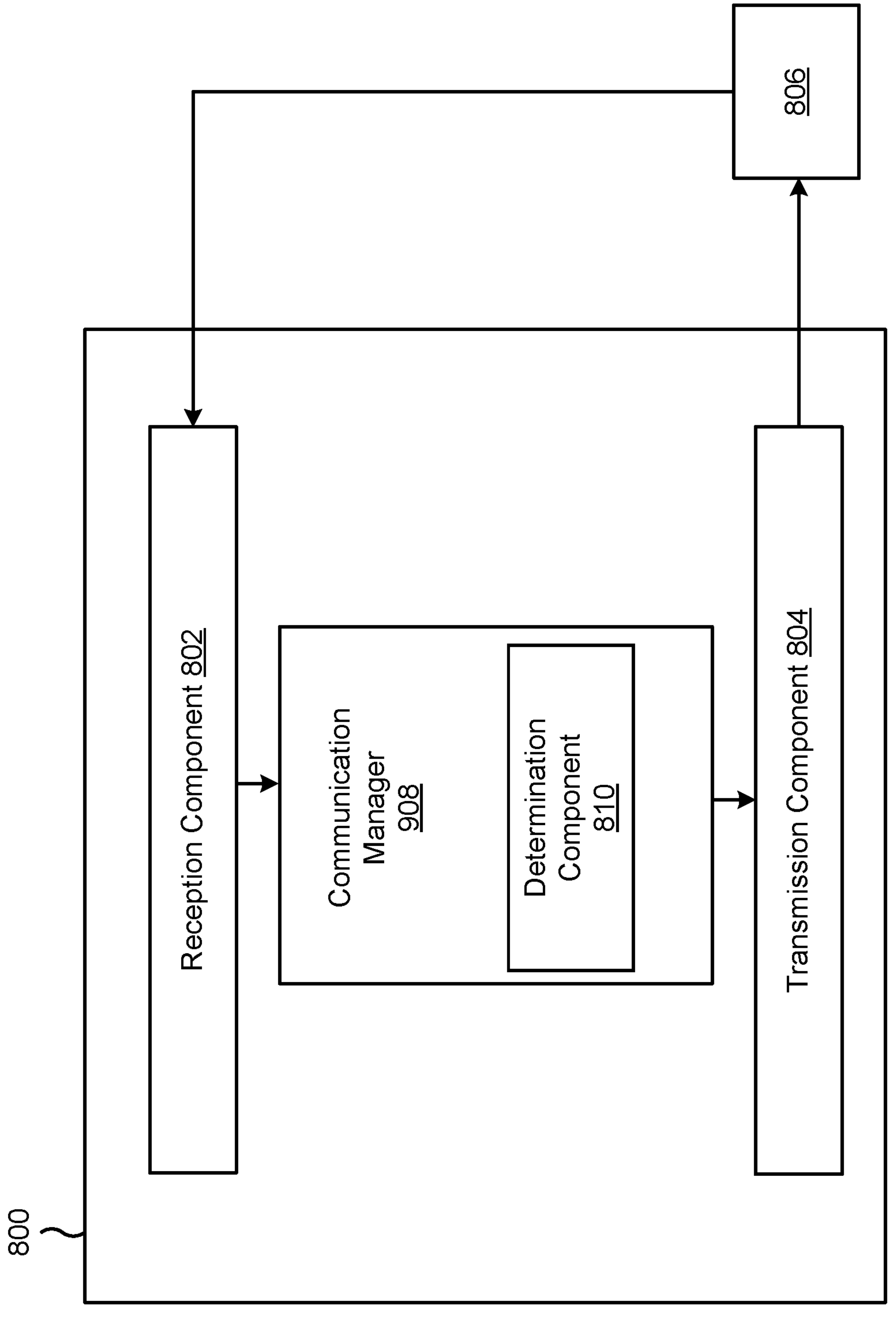
FIGS. 8 and 9 are diagrams of example apparatuses for wireless communication, in accordance with the present disclosure.

FIG. 8 is a diagram of an example apparatus 800 for wireless communication. The apparatus 800 may be a receiving device, or a receiving device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808. The communication manager 808 may include a determination component 810.

In some aspects, the apparatus 800 may be configured to perform one or more operations described herein in connection with FIG. 4. Additionally, or alternatively, the apparatus 800 may be configured to perform one or more processes described herein, such as process 500 of FIG. 5, process 700 of FIG. 7, or a combination thereof. In some aspects, the apparatus 800 and/or one or more components shown in FIG. 8 may include one or more components of the base station and/or the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station and/or the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station and/or the UE described in connection with FIG. 2. In some aspects, the transmission component 804 may be co-located with the reception component 802 in a transceiver.

The reception component 802 may receive, from a first wireless communication device on a first communication channel, a first communication that is configured with at least one GI sequence of a first GI type. The reception component 802 may receive, from the first wireless communication device or a second wireless communication device on the first communication channel or a second communication channel, a second communication that is configured with at least one GI sequence of a second GI type.

The transmission component 804 may transmit, to the first wireless communication device, a first GI configuration that indicates the at least one GI sequence of the first GI type.

The transmission component 804 may transmit, to the second wireless communication device, a second GI configuration that indicates the at least one GI sequence of the second GI type.

The transmission component 804 may transmit, to the first wireless communication device, a second GI configuration that indicates the at least one GI sequence of the second GI type.

The communication manager 808 and/or the determination component 810 may determine that the second communication satisfies at least one symbol level processing criterion, wherein the second GI type comprises the non-zero GI type based at least in part on determining that the second communication satisfies the at least one symbol level processing criterion. In some aspects, the communication manager 808 may be, or be similar to, the communication manager 140 and/or the communication manager 150 shown in FIGS. 1 and 2. In some aspects, the communication manager 808 may include one or more antennas, a modem, a modulator, a transmit MIMO processor, a transmit processor, a controller/processor, a memory, or a combination thereof, of the base station and/or the UE described in connection with FIG. 2. In some aspects, the communication manager 808 may include the reception component 802 and/or the transmission component. In some aspects, the determination component 810 may include one or more antennas, a modem, a modulator, a transmit MIMO processor, a transmit processor, a controller/processor, a memory, or a combination thereof, of the base station and/or the UE described in connection with FIG. 2. In some aspects, the determination component 810 may include the reception component 802 and/or the transmission component 804.

The determination component 810 may determine a selected GI type of a plurality of GI types to be used to receive a communication from a wireless communication device. The reception component 802 may receive the communication from the wireless communication device and based at least in part on a GI sequence of the selected GI type.

The determination component 810 may determine that a processing criterion satisfies a processing threshold, wherein determining the selected GI type comprises determining the selected GI type based at least in part on determining that the processing criterion satisfies the processing threshold.

The reception component 802 may receive a GI configuration that indicates a gap in each symbol of a plurality of symbols to facilitate resetting the GI type for partial processing.

The determination component 810 may determine an updated GI type of the plurality of GI types to be used to receive an additional communication from at least one of the wireless communication device or an additional wireless communication device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
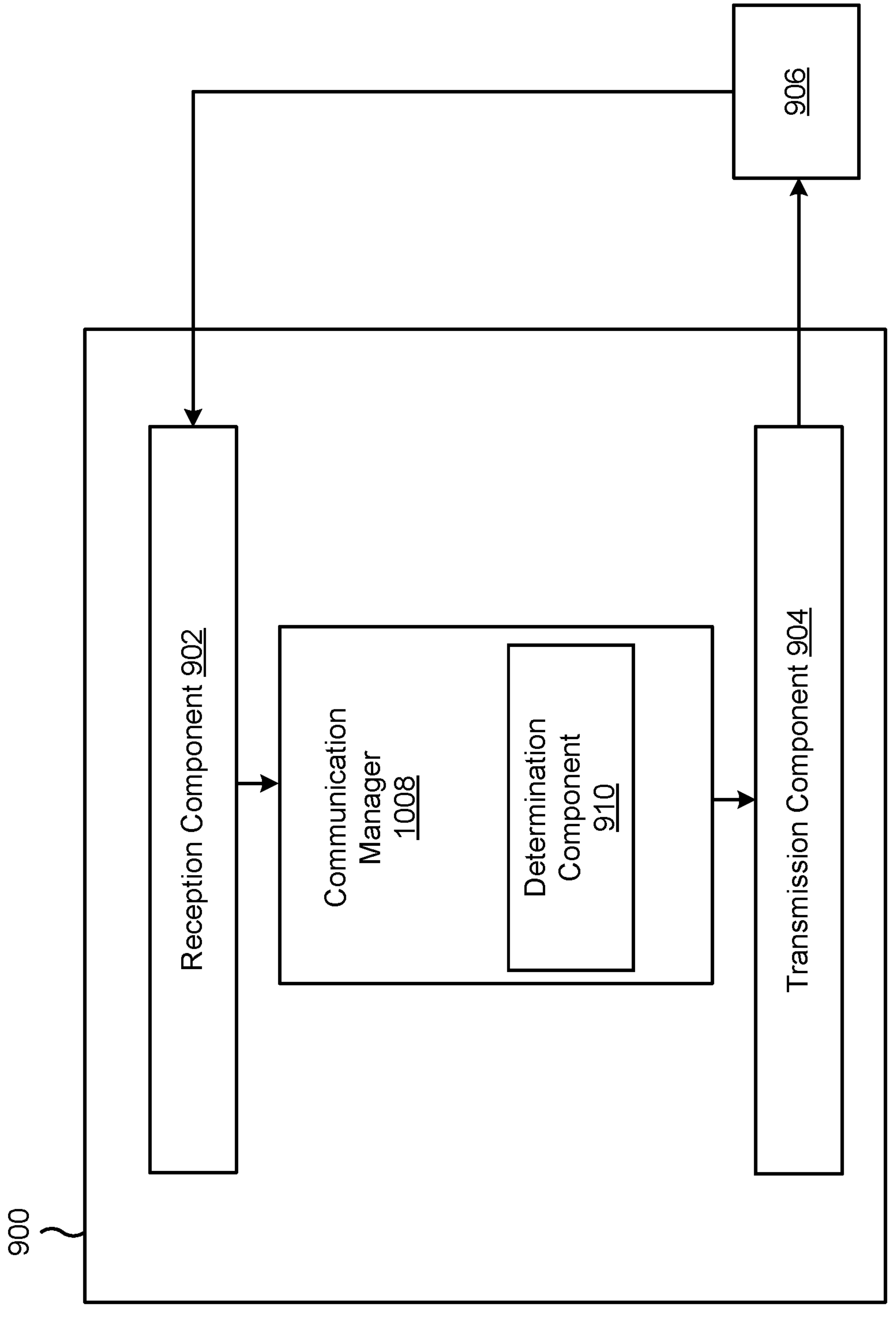

FIG. 9 is a diagram of an example apparatus 900 for wireless communication. The apparatus 900 may be a transmitting device, or a transmitting device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908. The communication manager 908 may include a determination component 910.

In some aspects, the apparatus 900 may be configured to perform one or more operations described herein in connection with FIG. 4. Additionally, or alternatively, the apparatus 900 may be configured to perform one or more processes described herein, such as process 600 of FIG. 6. In some aspects, the apparatus 900 and/or one or more components shown in FIG. 9 may include one or more components of the transmitting device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station and/or the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station and/or the UE described in connection with FIG. 2. In some aspects, the transmission component 904 may be co-located with the reception component 902 in a transceiver.

The transmission component 904 may transmit, to a wireless communication device on a first communication channel, a first communication that is configured with at least one GI sequence of a first GI type. The transmission component 904 may transmit, to the wireless communication device on a second communication channel, a second communication that is configured with at least one GI sequence of a second GI type.

The reception component 902 may receive a GI configuration that indicates the at least one GI sequence of the first GI type and the at least one GI sequence of the second GI type.

The communication manager 908 and/or the determination component 910 may determine that the second communication satisfies at least one symbol level processing criterion, wherein the second GI type comprises the non-zero GI type based at least in part on determining that the second communication satisfies the at least one symbol level processing criterion. In some aspects, the communication manager 908 may be, or be similar to, the communication manager 140 and/or the communication manager 150 shown in FIGS. 1 and 2. In some aspects, the communication manager 908 may include one or more antennas, a modem, a modulator, a transmit MIMO processor, a transmit processor, a controller/processor, a memory, or a combination thereof, of the base station and/or the UE described in connection with FIG. 2. In some aspects, the communication manager 908 may include the reception component 902 and/or the transmission component. In some aspects, the determination component 910 may include one or more antennas, a modem, a modulator, a transmit MIMO processor, a transmit processor, a controller/processor, a memory, or a combination thereof, of the base station and/or the UE described in connection with FIG. 2. In some aspects, the determination component 910 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a receiving device, comprising: receiving, from a first wireless communication device on a first communication channel, a first communication that is configured with at least one guard interval (GI) sequence of a first GI type; and receiving, from the first wireless communication device or a second wireless communication device on the first communication channel or a second communication channel, a second communication that is configured with at least one GI sequence of a second GI type.

Aspect 2: The method of Aspect 1, further comprising transmitting, to the first wireless communication device, a first GI configuration that indicates the at least one GI sequence of the first GI type.

Aspect 3: The method of Aspect 2, further comprising transmitting, to the second wireless communication device, a second GI configuration that indicates the at least one GI sequence of the second GI type.

Aspect 4: The method of either of Aspects 2 or 3, further comprising transmitting, to the first wireless communication device, a second GI configuration that indicates the at least one GI sequence of the second GI type.

Aspect 5: The method of any of Aspects 1-4, wherein the first GI type comprises a zero GI type.

Aspect 6: The method of Aspect 5, wherein the first communication channel comprises a physical downlink control channel.

Aspect 7: The method of either of Aspects 5 or 6, wherein the first communication comprises an ultra-reliable low latency communication.

Aspect 8: The method of any of Aspects 1-7, wherein the second GI type comprises a non-zero GI type.

Aspect 9: The method of Aspect 8, further comprising determining that the second communication satisfies at least one symbol level processing criterion, wherein the second GI type comprises the non-zero GI type based at least in part on determining that the second communication satisfies the at least one symbol level processing criterion.

Aspect 10: A method of wireless communication performed by a transmitting device, comprising: transmitting, to a wireless communication device on a first communication channel, a first communication that is configured with at least one guard interval (GI) sequence of a first GI type; and transmitting, to the wireless communication device on a second communication channel, a second communication that is configured with at least one GI sequence of a second GI type.

Aspect 11: The method of Aspect 10, further comprising receiving a GI configuration that indicates the at least one GI sequence of the first GI type and the at least one GI sequence of the second GI type.

Aspect 12: The method of either of Aspects 10 or 11, wherein the first GI type comprises a zero GI type.

Aspect 13: The method of Aspect 12, wherein the first communication channel comprises a physical downlink control channel.

Aspect 14: The method of Aspect 13, wherein the first communication comprises an ultra-reliable low latency communication.

Aspect 15: The method of any of Aspects 10-14, wherein the second GI type comprises a non-zero GI type.

Aspect 16: The method of Aspect 15, further comprising determining that the second communication satisfies at least one symbol level processing criterion, wherein the second GI type comprises the non-zero GI type based at least in part on determining that the second communication satisfies the at least one symbol level processing criterion.

Aspect 17: A method of wireless communication performed by a receiving device, comprising: determining a selected guard interval (GI) type of a plurality of GI types to be used to receive a communication from a wireless communication device; receiving the communication from the wireless communication device and based at least in part on a GI sequence of the selected GI type.

Aspect 18: The method of Aspect 17, further comprising determining that a processing criterion satisfies a processing threshold, wherein determining the selected GI type comprises determining the selected GI type based at least in part on determining that the processing criterion satisfies the processing threshold.

Aspect 19: The method of either of Aspects 17 or 18, further comprising receiving a GI configuration that indicates a gap in each symbol of a plurality of symbols to facilitate resetting the GI type for partial processing.

Aspect 20: The method of Aspect 19, further comprising determining an updated GI type of the plurality of GI types to be used to receive an additional communication from at least one of the wireless communication device or an additional wireless communication device.

Aspect 21: The method of Aspect 20, wherein the selected GI type comprises a zero GI type and wherein the updated GI type comprises a non-zero GI type.

Aspect 22: An apparatus for wireless communication at a device, comprising a processor; memory coupled with the processor; and instructions stored in the memory and executable by the processor to cause the apparatus to perform the method of one or more of Aspects 1-9.

Aspect 23: A device for wireless communication, comprising a memory and one or more processors coupled to the memory, the one or more processors configured to perform the method of one or more of Aspects 1-9.

Aspect 24: An apparatus for wireless communication, comprising at least one means for performing the method of one or more of Aspects 1-9.

Aspect 25: A non-transitory computer-readable medium storing code for wireless communication, the code comprising instructions executable by a processor to perform the method of one or more of Aspects 1-9.

Aspect 26: A non-transitory computer-readable medium storing a set of instructions for wireless communication, the set of instructions comprising one or more instructions that, when executed by one or more processors of a device, cause the device to perform the method of one or more of Aspects 1-9.

Aspect 27: An apparatus for wireless communication at a device, comprising a processor; memory coupled with the processor; and instructions stored in the memory and executable by the processor to cause the apparatus to perform the method of one or more of Aspects 10-16.

Aspect 28: A device for wireless communication, comprising a memory and one or more processors coupled to the memory, the one or more processors configured to perform the method of one or more of Aspects 10-16.

Aspect 29: An apparatus for wireless communication, comprising at least one means for performing the method of one or more of Aspects 10-16.

Aspect 30: A non-transitory computer-readable medium storing code for wireless communication, the code comprising instructions executable by a processor to perform the method of one or more of Aspects 10-16.

Aspect 31: A non-transitory computer-readable medium storing a set of instructions for wireless communication, the set of instructions comprising one or more instructions that, when executed by one or more processors of a device, cause the device to perform the method of one or more of Aspects 10-16.

Aspect 32: An apparatus for wireless communication at a device, comprising a processor; memory coupled with the processor; and instructions stored in the memory and executable by the processor to cause the apparatus to perform the method of one or more of Aspects 17-21.

Aspect 33: A device for wireless communication, comprising a memory and one or more processors coupled to the memory, the one or more processors configured to perform the method of one or more of Aspects 17-21.

Aspect 34: An apparatus for wireless communication, comprising at least one means for performing the method of one or more of Aspects 17-21.

Aspect 35: A non-transitory computer-readable medium storing code for wireless communication, the code comprising instructions executable by a processor to perform the method of one or more of Aspects 17-21.

Aspect 36: A non-transitory computer-readable medium storing a set of instructions for wireless communication, the set of instructions comprising one or more instructions that, when executed by one or more processors of a device, cause the device to perform the method of one or more of Aspects 17-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device, comprising:

one or more antennas; and one or more processors and one or more memories that store code for the one or more processors, the one or more processors configured to cause the first wireless communication device to:

transmit, to a second wireless communication device, a first guard interval (GI) configuration that indicates at least one GI sequence of a zero GI type, wherein the zero GI type corresponds to GIs having no time duration;

transmit, to a third wireless communication device, a second GI configuration that indicates at least one GI sequence of a non-zero GI type, wherein the non-zero GI type corresponds to GIs having a time duration;

receive, from the second wireless communication device, a first communication that is configured with the at least one GI sequence of the zero GI type; and receive, from the third wireless communication device, a second communication that is configured with the at least one GI sequence of the non-zero GI type different than the first GI type, wherein the first GI type or the second GI type is selected for a communication based at least in part on:

an availability of processing at the receiving device, whether the communication is a low latency communication, or whether a channel for the communication is a control channel.

2. The first wireless communication device of claim 1, wherein the one or more processors are further configured to cause the first wireless communication device to:

transmit, to the second wireless communication device, the second GI configuration that indicates the at least one GI sequence of the non-zero GI type.

3. The first wireless communication device of claim 1, wherein a first communication channel of the first communication comprises a physical downlink control channel.

4. The first wireless communication device of claim 1, wherein the first communication comprises an ultra-reliable low latency communication.

5. The first wireless communication device of claim 1, wherein the one or more processors are further configured to cause the first wireless communication device to:

determine that a symbol level processing criterion, associated with an availability of processing at the first wireless communication device, satisfies a processing threshold, wherein the first communication is associated with the zero GI type based at least in part on the determination.

6. The first wireless communication device of claim 1, wherein the one or more processors are further configured to cause the first wireless communication device to:

determine an updated GI type; and receive, from the second wireless communication device, a third communication in accordance with the updated GI type.

7. The first wireless communication device of claim 1, wherein the one or more processors are further configured to cause the first wireless communication device to:

determine an updated GI type; and receive, from the third wireless communication device, a third communication in accordance with the updated GI type.

8. The first wireless communication device of claim 1, wherein the one or more processors are further configured to cause the first wireless communication device to:

receive a third GI configuration indicating a gap in each symbol of a plurality of symbols.

9. A first wireless communication device, comprising:

one or more antennas; and one or more processors and one or more memories that store code for the one or more processors, the one or more processors configured to cause the first wireless communication device to:

receive, from a second wireless communication device, a first guard interval (GI) configuration and a second GI configuration, wherein the first GI configuration indicates at least one GI sequence of a zero GI type, wherein the zero GI type corresponds to GIs having no time duration, wherein the second GI configuration indicates at least one GI sequence of a non-zero GI type, and wherein the non-zero GI type corresponds to GIs having a time duration;

transmit, to the second wireless communication device, a first communication that is configured with the at least one GI sequence of the zero GI type; and transmit, to the second wireless communication device, a second communication that is configured with the at least one GI sequence of the non-zero GI type.

10. The first wireless communication device of claim 9, wherein a first communication channel of the first communication comprises a physical downlink control channel.

11. The first wireless communication device of claim 9, wherein the first communication comprises an ultra-reliable low latency communication.

12. The first wireless communication device of claim 9, wherein the one or more processors are further configured to cause the first wireless communication device to:

determine that a symbol level processing criterion, associated with an availability of processing at the first wireless communication device, satisfies a processing threshold, wherein the first communication is associated with the zero GI type based at least in part on the determination.

13. The first wireless communication device of claim 9, wherein the one or more processors, to cause the first wireless communication device to transmit the first communication, are configured to cause the first wireless communication device to:

transmit the first communication on a first communication channel.

14. The first wireless communication device of claim 13, wherein the one or more processors, to cause the first wireless communication device to transmit the second communication, are configured to cause the first wireless communication device to:

transmit the second communication on the first communication channel.

15. The first wireless communication device of claim 13, wherein the one or more processors, to cause the first wireless communication device to transmit the second communication, are configured to cause the first wireless communication device to:

transmit the second communication on a second communication channel.

16. A method of wireless communication performed by a first wireless communication device, comprising:

transmitting, to a second wireless communication device, a first guard interval (GI) configuration that indicates at least one GI sequence of a zero GI type, wherein the zero GI type corresponds to GIs having no time duration;

transmitting, to a third wireless communication device, a second GI configuration that indicates at least one GI sequence of a non-zero GI type, wherein the non-zero GI type corresponds to GIs having a time duration;

receiving, from the second wireless communication device, a first communication that is configured with the at least one GI sequence of the zero GI type; and receiving, from the third wireless communication device, a second communication that is configured with the at least one GI sequence of the non-zero GI type.

17. The method of claim 16, further comprising:

transmitting, to the second wireless communication device, the second GI configuration that indicates the at least one GI sequence of the non-zero GI type.

18. The method of claim 16, wherein a first communication channel of the first communication comprises a physical downlink control channel.

19. The method of claim 16, wherein the first communication comprises an ultra-reliable low latency communication.

20. The method of claim 16, further comprising:

determining that a symbol level processing criterion, associated with an availability of processing at the first wireless communication device, satisfies a processing threshold, wherein the first communication is associated with the zero GI type based at least in part on the determination.

21. The method of claim 16, further comprising:

determining an updated GI type; and receiving, from the second wireless communication device, a third communication in accordance with the updated GI type.

22. The method of claim 16, further comprising:

determining an updated GI type; and receiving, from the third wireless communication device, a third communication in accordance with the updated GI type.

23. The method of claim 16, further comprising:

receiving a third GI configuration indicating a gap in each symbol of a plurality of symbols.

24. The method of claim 16, further comprising:

selecting the zero GI type for the first communication based at least in part on availability of processing at the first wireless communication device.

25. A method of wireless communication performed by a first wireless communication device, comprising:

receiving, from a second wireless communication device, a first guard interval (GI) configuration and a second GI configuration, wherein the first GI configuration indicates at least one GI sequence of a zero GI type, wherein the zero GI type corresponds to GIs having no time duration, wherein the second GI configuration indicates at least one GI sequence of a non-zero GI type, and wherein the non-zero GI type corresponds to GIs having a time duration;

transmitting, to the second wireless communication device, a first communication that is configured with the at least one GI sequence of the zero GI type; and transmitting, to the second wireless communication device, a second communication that is configured with the at least one GI sequence of the non-zero GI type.

26. The method of claim 25, further comprising:

determining that a symbol level processing criterion, associated with an availability of processing at the first wireless communication device, satisfies a processing threshold, wherein the first communication is associated with the zero GI type based at least in part on the determination.

27. The method of claim 25, wherein a first communication channel of the first communication comprises a physical downlink control channel.

28. The method of claim 25, wherein the first communication comprises an ultra-reliable low latency communication.

29. The method of claim 25, wherein the first communication is transmitted on a first communication channel and the second communication is transmitted on a second communication channel.

30. The method of claim 25, wherein the first communication and the second communication are transmitted on a same communication channel.

* * * * *